Nov. 29, 1966 J. C. KING 3,288,695

PIEZOELECTRIC QUARTZ CRYSTAL UNITS

Filed May 9, 1962 2 Sheets-Sheet 1

INVENTOR
J. C. KING
BY [signature]
ATTORNEY

Nov. 29, 1966 J. C. KING 3,288,695

PIEZOELECTRIC QUARTZ CRYSTAL UNITS

Filed May 9, 1962 2 Sheets-Sheet 2

INVENTOR
J. C. KING

BY [signature]

ATTORNEY 3,288,695
Patented Nov. 29, 1966

3,288,695
PIEZOELECTRIC QUARTZ CRYSTAL UNITS

James C. King, Whippany, N.J., assignor to Bell Telephone Laboratories, Incorporated, New York, N.Y., a corporation of New York Filed May 9, 1962, Ser. No. 193,574
6 Claims. (Cl. 204—157.1)

This application is a continuation-in-part of application Serial No. 118,692 filed June 21, 1961, now U.S. Patent 3,113,224 issued December 3, 1963.

This invention relates to piezoelectric quartz crystals. More particularly it concerns a method for improving the high temperature acoustic efficiency of treated synthetic quartz.

Quartz crystals, both natural and synthetic, are well established for use in piezoelectric devices such as frequency standards, oscillators, filters, delay lines, microphones, etc.

Intense recent interest in the efficient and stable operation of these devices at elevated temperatures make too apparent the inability of ordinary quartz piezoelectric quartz crystals to efficiently perform at temperatures in excess of 250° C. Specifically, natural quartz has a room temperature absorption as little as $5 \cdot 10^{-7}$ at 1 mc. However, at 500° C. the absorption at the same operating frequency is $10^{-3}$ rendering the crystal virtually useless.

It has now been found that quartz crystals which have been subjected to an electrolytic treatment, of a nature hereinafter fully described, essentially retain their electrocoustic efficiency to the $\alpha$-$\beta$ transistion temperature, approximately 550° C. Specifically, the absorption value in typical crystals over the entire temperature range of 25° C. to 550° C. was found to remain virtually constant, varying only from $10^{-6}$ to $5 \cdot 10^{-6}$.

As a consequence of high temperature operation a further and quite significant advantage is realized. The usual quartz resonators when exposed to optical saturation with ionizing radiation exhibit an average down shift in frequency of 20 p.p.m. for natural quartz and an upward shift of the same magnitude for synthetic quartz. Both of these undesirable deviations can be annealed out in a few minutes at elevated temperatures of the order of 350° C. according to known techniques. Consequently, a crystal according to this invention operating at an elevated temperature is effectively transparent to ionizing radiation such as X-rays or $\gamma$-rays. Furthermore, displacement damage in piezoelectric quartz crystals, caused by high energy radiation, such as fast neutron bombardment, is known to anneal at a reasonable rate at 800° C. An isochronal evaluation of the activation energy for this annealing mechanism indicates a finite annealing function at lower temperatures, for instance 500° C. Accordingly, operation of the piezoelectric quartz devices at elevated temperatures made possible by this invention results in a significant degree of annealing in many radiation environments. For instance, such crystals are capable of dependable and efficient operation in environments proximate to nuclear reactors or in satellite systems which traverse the Van Allen radiation belt.

It has now been found that not only can the detrimental effects of radiation be annealed out at elevated temperatures, but the resulting crystal actually shows a significant improvement in efficiency over the pre-irradiation properties. This improvement is so profound that, for a given sample irradiated and annealed according to this invention and operating at temperatures in excess of approximately 400° C., the acoustic absorption is actually less than the room temperature absorption. This is in contrast to the unirradiated material which at 560° C. showed an absorption of over four times the room temperature value.

With regard to the adaptation of high temperature resonators to precision frequency standards, at least two operating characteristics are measurably enhanced. Both the initial frequency stabilization rate and the drive, or elastic strain-frequency sensitivity, are dependent upon thermally activated mechanisms in the crystal lattice. Thus, the frequency aging rate at elevated temperatures is accelerated resulting in a shorter stabilization period. Also, the strain energy has a less pronounced effect on the elastic modulus of the medium. Similar advantages inhere in the high temperature operation of other piezoelectric devices.

The electrolytic treatment which promotes the high temperature efficiency of natural and synthetic piezoelectric quartz crystals according to this invention involves subjecting the quartz to a high intensity field at an elevated temperature for a prescribed time period as will be hereinafter more fully described.

This invention may perhaps be more easily understood when considered in conjunction with the drawing in which.

Figure 1:
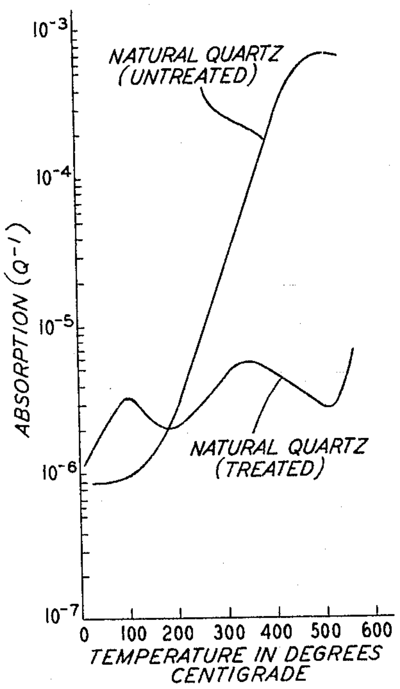
FIG. 1 is a plot of the absorption by internal friction (reciprocal of Q) in a natural quartz crystal vs. temperature in degrees centigrade at 5 mc. operating frequency illustrating the unexpected improvement in high temperature performance of natural quartz crystals treated in accordance with this invention.
Figure 2:
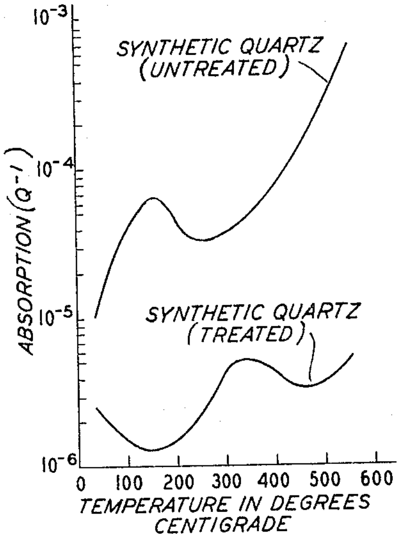
FIG. 2 is a plot similar to that of FIG. 1 illustrating the same effect in synthetic quartz crystals.

FIGS. 1 and 2 demonstrate the unexpected high temperature characteristics of natural and synthetic quartz when electrolytically treated. Each figure includes two curves designated "untreated" and "treated" respectively. These points were obtained at 5 mc., 5th overtone with plane-convex plates 1.50 cm. in diameter. The crystal of FIG. 2 was Z-growth. Both crystals were AT-cut.

As is seen the treated quartz in each instance exhibits far superior efficiency over the elevated temperature ranges particularly in excess of 300° C.

As is well established in the art, piezoelectric quartz crystals resonate most efficiently in characteristic modes under given conditions. Quartz crystals in current device applications utilize predominantly thickness shear mode vibration and are generally AT-cut. The AT-cut is a Y-cut rotated in a positive direction (ref. I.R.E. standard) about the X-axis. For any given operating temperature the crystal must be cut at a corresponding angle to provide a turn-over point or inflection point in the frequency vs. temperature relation. This turn-over point, as is well known in the art, is essential to provide a frequency stable area of operation over a small but controllable temperature range. Heretofore, the high temperature properties of quartz have not been thoroughly investigated due primarily to its high loss behavior. Specifically, prior investigations were restricted primarily to crystals having turn-over points of less than 250° C. thus avoiding the problem of excessive energy absorption at higher temperatures.

Figure 3:
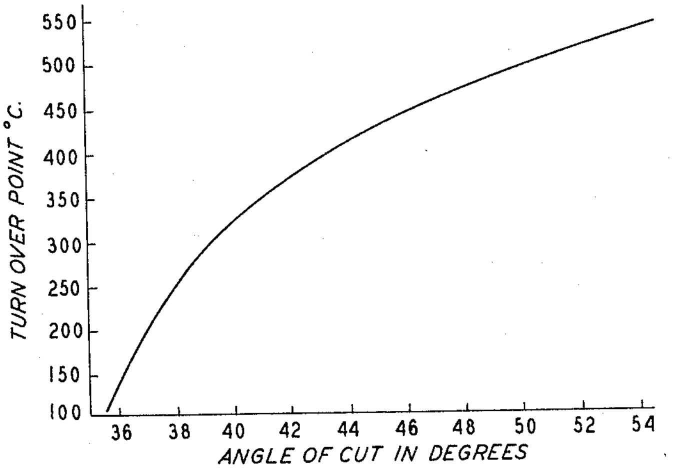
FIG. 3 is a plot of the turn-over point in degrees centigrade vs. the angle of cut of the quartz crystal correlating the appropriate operating temperature for a given AT crystal cut.

FIG. 3 shows the relation between the turn-over point and the crystal angle for the conventional AT-cut. This shows that at 250° C. the optimum angle is approximately 38°. It has been found in practice that for AT-cut quartz, a useful turn-over point coupled with high efficiency occurs at room temperature at an angle of 35°20.5′. Accordingly, prior art device design has generally adapted cut angles of this general magnitude.

Due to high loss at higher temperatures, corresponding to cut angles much in excess of this value, it is accepted in the art that cuts in excess of 38° are virtually useless. It is for operating temperatures in excess of 300° C. corresponding to crystal cuts of at least 39°25′ that this invention is primarily adapted. High temperature applications presently contemplated require temperatures in excess of 350° C. for which the cut angle is 40°50′. This is a preferred minimum cut angle for many uses.

According to a preferred embodiment of this invention, the electrolytic treatment which provides the efficient high temperature operation of both natural and synthetic quartz was carried out essentially as follows.

Gold electrodes were deposited on opposing faces of a quartz block approximately 2 cm. in cross section. The block was placed in a furnace with high voltage leads attached to the gold electrodes. The furnace was heated to 500° C. A field of 2.7 kilovolts/cm. was impressed across the block and the block was retained under these conditions for a period of 48 hours. Crystals were then cut from this block in a wafer shape with one plane and one convex surface having dimensions of 15 mm. in diameter and 1.5 mm. thick. Typical crystals treated in this manner and cut with prescribed angles exhibit turn-over points which are tabulated in the following table.

TABLE I

| Example | Type | Cut | Angle | Turn-over Point, ° C. |
|---|---|---|---|---|
| 1 | Synthetic | AT | 39°25′ | 300 |
| 2 | do | AT | 40°50′ | 350 |
| 3 | do | AT | 49° | 492 |
| 4 | do | AT | 50° | 505 |
| 5 | do | AT | 51° | 517 |
| 6 | do | AT | 52° | 528 |
| 7 | do | AT | 52° | 535 |
| 8 | Natural (Brazillian) | AT | 53° | 535 |
| 9 | Synthetic | BT | −13° | 300 |
| 10 | do | BT | −7°30′ | 450 |
| 11 | do | CT | 43° | 300 |
| 12 | do | DT | −53° | 300 |

Good high temperature response can be obtained according to this electrolytic treatment with temperatures in the range of 350° C. to 550° C. and fields in the range of 500 volts/cm. to $10^6$ volts/cm. Low temperatures coupled with low field intensity require a longer treatment time. It has been found preferable to operate in the ranges 400° C. to 520° C. at 1 to 3 kv. field intensity. For treatments according to these conditions durations of at least 12 hours are required.

Since for practical applications the art has adopted the AT cut for piezoelectric quartz crystals, primary attention has been directed to that cut. However, investigations show that the phenomenon on which this invention is based also occurs in other cuts, specifically the BT, CT and DT cuts corresponding to Examples 8, 9, 10 and 11. Accordingly, this invention encompasses all quartz piezoelectric crystals which have been electrolyzed with the prescribed conditions and can thus be utilized at temperatures in excess of 300° C. The appropriate manner of defining such crystals is those which exhibit a turn-over point (i.e., inflection point) in their frequency vs. temperature characteristics in excess of 300° C.

Figure 4:
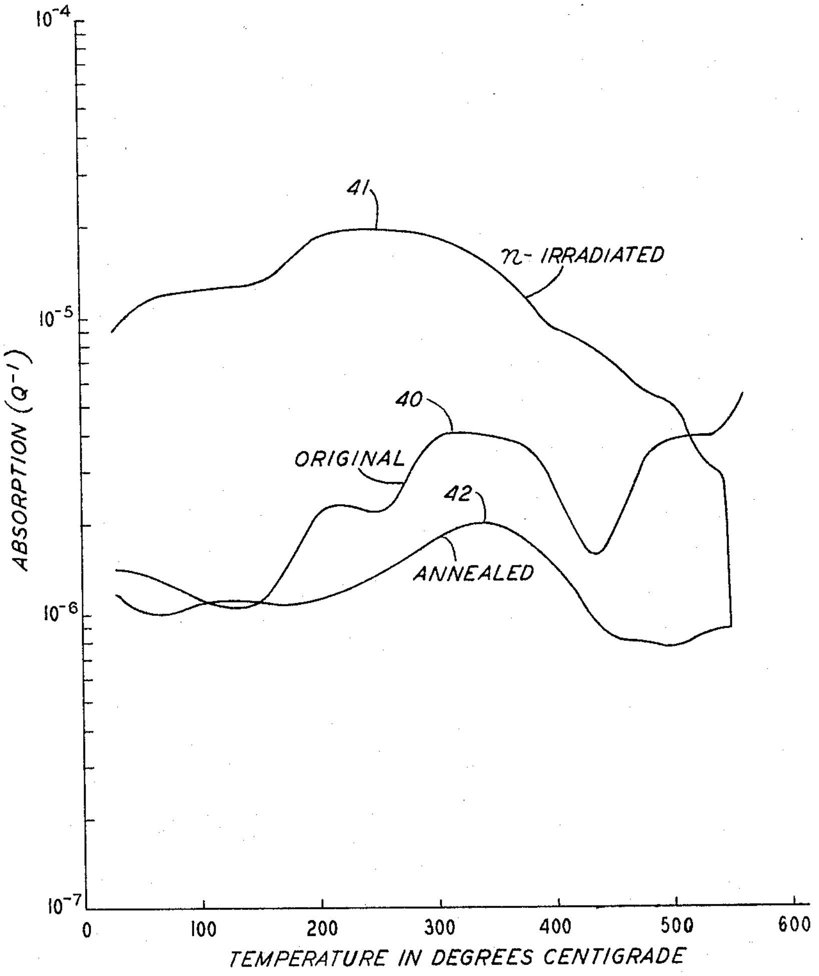
FIG. 4 is a plot similar to that of FIGS. 1 and 2 showing the improvement in $Q^{-1}$ of treated quartz crystals obtained through irradiation and anneal.

FIG. 4 illustrates the improvement in piezoelectric efficiency obtained by virtue of irradiating and annealing a quartz crystal body. The figure shows three curves, curve 40 for a sample which had been previously electrolyzed according to the procedure outlined above, curve 41 for a similar sample which had been irradiated, and a third curve 42 showing absorption behavior after anneal. The coordinates again are reciprocal Q vs. temperature. These measurements were made at a frequency of 9 mc.

The irradiation and annealing were carried out as follows. An AT-cut, thickness shear, Z-growth electrolyzed synthetic quartz resonator was exposed to an integrated fast neutron flux of $10^{18}$ *nvt*. The exposure period was 46 days. The absorption behavior of the irradiated sample was then measured over the indicated temperature range and is recorded as curve 41 of FIG. 4. The irradiated crystal unit was then annealed in vacuum at 500° C. for approximately six days. The absorption characteristics after anneal were then measured and are recorded as curve 42 of FIG. 4. As is seen the annealed sample showed a significant improvement over the original sample (curve 40). The $Q^{-1}$ at 500° C. was less than $8 \cdot 10^{-7}$ which is a measure of efficiency that compares well with that of the highest quality natural Brazillian quartz even at room temperature.

The radiation exposure used for this illustration is well into the range in which significant dislocation damage in quartz is known to occur. At exposures of less than $10^{17}$ *nvt* the damage is relatively slight and the crystal retains sufficient quality so that annealing is unnecessary. For exposures of greater than $3 \cdot 10^{19}$ *nvt* the crystal undergoes severe damage and is essentially beyond repair by these techniques.

While these results were obtained with fast neutron radiation, it is well known that other high energy particles, such as protons or electrons, also cause dislocation damage in the same manner. The physical damage resulting from any of these particles is essentially identical in nature since it is merely the result of high energy collisions which can obtain regardless of the nature or charge of the particle. Since the mass of the particle determines the energy it is capable of transferring on impact, it is difficult to place a critical value on flux densities which will impart dislocation damage to the crystal. However, one can specify the radiation level in terms of the energy necessary to displace an ion from the lattice. A minimum value for particles capable of displacing an oxygen atom from the quartz lattice is 25 electron volts. Thus, intended within the scope of this invention to achieve the results set forth, are high energy particles capable of delivering 25 electron volts to the ions in the lattice. These particles may derive their existence from a radiation source outside the crystal, as in the usual case, or may be first order reaction products such as high energy electrons originating within the crystal as a result of high energy irradiation.

This limitation characterizes the type of radiation necessary to impart displacement damage to the crystal. A quantitative value on the amount of such damage considered within the scope of this invention is $10^{15}$ displacements per cubic centimeter.

The annealing temperature may vary within reasonable limits and, as is well known in the art, the higher the temperature the more effective is the anneal in terms of time required to achieve a given result. However, for piezoelectric crystal units the anneal temperature should not significantly exceed 573° C. which is the $\alpha$-$\beta$ transition temperatures and at which point the danger of twining is introduced. Twinned crystals are virtually useless for quality piezoelectric units. From an extrapolation of data obtained at various temperatures it may be reasonably predicted that the annealing time for removing any significant amount of radiation damage becomes impractically long for annealing temperatures of less than 300° C. Accordingly, for the purposes of this embodiment an annealing temperature in the range of 300° C. to 573° C. is prescribed and preferably 500° C. to 573° C.

The anneal time is, of course, dependent both upon the amount of radiation exposure and the anneal temperature. It is not expected that any useful results will accrue for anneal times of less than one-half day.

It will occur to those skilled in the art, in view of these teachings that radiation damage can be continuously annealed out while the sample remains in the radiation environment merely by virtue of operating the crystal unit at temperatures effective for annealing in the absence of radiation. This is indicated by the fact that damage caused by a heavy fast neutron bombardment of the crystal unit as described above for a 46 day duration required only six days to anneal out. Such continuous annealing of radiation damage while in the radiation environment is to be properly considered a form of this invention.

The resonant frequency of the crystal also undergoes a radical change as a result of irradiation. For instance, the crystal unit described above showed a variation of 925 parts per million after the fast neutron bombardment. It has been found that frequency variations can also be annealed out according to the principles of this invention and irradiation of the resonant crystal while the temperature of the crystal is maintained at the annealing temperature produces no significant frequency variation.

Various other modifications and embodiments will become apparent to those skilled in the art. However, all such variations which basically rely on the teachings through which this invention has advanced the art are properly considered within the scope of this invention.

What is claimed is:

1. A method for improving the piezoelectric properties of a synthetic quartz crystal which comprises the steps of electrolyzing the crystal by impressing an electric field in the range 500 volts/cm. to $10^6$ volts/cm. across the crystal while maintaining it at a temperature in the range 350° C. to 550° C., exposing the crystal to high energy radiation of between $10^{17}$ *nvt* and $3 \cdot 10^{19}$

*nvt* capable of producing dislocation damage in the crystal and annealing said crystal at a temperature in the range of 300° C. to 573° C. and for at least 12 hours.

2. The method of claim 1 wherein the irradiating step and annealing step occur successively.

3. The method of claim 1 wherein the irradiating step and annealing step occur simultaneously.

4. The method of claim 3 wherein the crystal is a shear mode resonant crystal with an AT-cut.

5. The method of claim 1 wherein the high energy radiation is a neutron flux of $10^{17}$ to $3 \cdot 10^{19}$ *nvt*.

6. The method of claim 1 wherein the annealing temperature is at least 500° C.

References Cited by the Examiner

UNITED STATES PATENTS

| | | | |
|---|---|---|---|
| 2,268,823 | 1/1942 | Herzog | 310—9.5 |
| 2,656,473 | 10/1953 | Warner | 310—8.9 |
| 2,945,793 | 7/1960 | Dugdale | 250—83 |
| 3,149,232 | 9/1964 | Jaffe et al. | 250—106 |

FOREIGN PATENTS

| | | |
|---|---|---|
| 631,636 | 11/1961 | Canada. |

OTHER REFERENCES

Nature, No. 4229 (Nov. 18, 1950) pages 864 and 865.

JOHN H. MACK, *Primary Examiner.*

MILTON O. HIRSHFIELD, WINSTON A. DOUGLAS, *Examiners.*

A. J. ROSSI, H. S. WILLIAMS, *Assistant Examiners.*